US012540864B2

(12) United States Patent
Hersman et al.

(10) Patent No.: US 12,540,864 B2
(45) Date of Patent: Feb. 3, 2026

(54) METHODS AND SYSTEMS FOR MITIGATING NOISE FOR MICROWAVE REMOTE SENSING

(71) Applicant: BAE Systems Space & Mission Systems Inc., Broomfield, CO (US)

(72) Inventors: Michael Stephen Hersman, Parker, CO (US); Sean Robert Geiger, Louisville, CO (US)

(73) Assignee: BAE Systems Space & Mission Systems Inc., Broomfield, CO (US)

(*) Notice: Subject to any disclaimer, the term of this patent is extended or adjusted under 35 U.S.C. 154(b) by 677 days.

(21) Appl. No.: 17/957,115

(22) Filed: Sep. 30, 2022

(65) Prior Publication Data

US 2023/0104508 A1 Apr. 6, 2023

Related U.S. Application Data

(60) Provisional application No. 63/251,474, filed on Oct. 1, 2021.

(51) Int. Cl.
*G01K 11/00* (2006.01)
(52) U.S. Cl.
CPC .................. *G01K 11/006* (2013.01)
(58) Field of Classification Search
CPC .................................................. G01K 11/006
USPC ....................................................... 324/76.14
See application file for complete search history.

(56) References Cited

U.S. PATENT DOCUMENTS

| 4,521,861 A * | 6/1985 | Logan ................... G01S 7/4021 |
| | | 702/57 |
| 8,334,684 B1 | 12/2012 | Lynch |
| 2007/0194800 A1* | 8/2007 | Novikov ............ G01R 27/2605 |
| | | 324/676 |

OTHER PUBLICATIONS

International Preliminary Report on Patentability for International (PCT) Patent Application No. PCT/US2022/045321, dated Apr. 11, 2024 7 pages.
International Search Report and Written Opinion for International (PCT) Patent Application No. PCT/US2022/045321, dated Jan. 30, 2023 11 pages.
Gierkink et al. "Intrinsic 1/f Device Noise Reduction and Its Effect on Phase Noise in CMOS Ring Oscillators," IEEE Journal of Solid-State Circuits, Jul. 1999, vol. 34, No. 7, pp. 1022-1025.

(Continued)

*Primary Examiner* — Stephanie E Bloss
*Assistant Examiner* — Michael A Harrison
(74) *Attorney, Agent, or Firm* — Sheridan Ross P.C.

(57) ABSTRACT

Radiometer systems and methods that mitigate flicker (1/f) noise are provided. A microwave radiometer system with accuracy impacted by 1/f noise comprises active components which, between measurements, are powered off and on. By powering the active components off and on, 1/f noise is mitigated. Disclosed systems and methods include performing a first measurement with a sensor of a radiometer, after performing the first measurement, switching power to one or more active components of the radiometer off, the active components comprising one or more of an amplifier, a square law detector, and an A/D converter, after switching the power to the one or more active components off, switching the power to the one or more active components on, and after switching the power to the one or more active components on, performing a second measurement with the sensor.

20 Claims, 5 Drawing Sheets

(56) References Cited

OTHER PUBLICATIONS

Jainwal et al. "Analysis and Validation of Low-Frequency Noise Reduction in MOSFET Circuits Using Variable Duty Cycle Switched Biasing," IEEE Journal of the Electron Devices Society, Feb. 2018, vol. 6, pp. 420-431.

Ogut et al. "A Novel 1/f Noise Mitigation Technique Applied to a 670 GHz Receiver," IEEE Transactions on Terahertz Science and Technology, Jan. 2021, vol. 11, No. 1, pp. 109-112.

\* cited by examiner

METHODS AND SYSTEMS FOR MITIGATING NOISE FOR MICROWAVE REMOTE SENSING

CROSS-REFERENCE TO RELATED APPLICATION

This application claims the benefit of U.S. Provisional Application Serial No. 63/251,474, filed Oct. 1, 2021, the entire disclosure of which is hereby incorporated herein by reference.

FIELD

The present disclosure relates generally to radiometry, and more particularly to mitigating flicker noise in radiometers.

BACKGROUND

Radiofrequency ("RF") and microwave systems include microwave radiometers which accurately measure the microwave power at the input of the system. This power level is proportional to temperature and can be used estimate physical temperature by comparing scene measurements to calibration measurements using targets of known temperature.

One common use of microwave radiometers is for remote sensing from orbit. In one approach, known as a total power radiometer, a radiometer utilizes a scanning antenna to scan across the earth, making multiple measurements during the scan. At the end of each scan, the radiometer is calibrated using known temperature targets. Typical timing parameters are ten milliseconds/measurement with a calibration interval of two seconds. It is critical that the radiometer is stable during the time period between calibrations. Any changes in gain or internal noise level during this calibration period cause errors in the measurements which cannot be removed with the calibrations.

Two sources of uncertainty, referred to as the "delta-T," in radiometric measurements are of interest here. The first source is the fluctuation due to fundamental limitations in forming a power estimate of a Gaussian thermal noise signal. This has a uniform power spectrum and is known as "white noise." This fluctuation can be reduced by increasing the measurement, or integration, time or increasing the bandwidth of the noise signal being measured. The second source of uncertainty is low frequency noise which may have a 1/f power spectrum density slope when plotted against frequency. This flicker ("1/f") noise is a fundamental property of all electronics circuits but is of particularly concern in analog circuitry present in high-precision measurement systems, and so can be a significant contributor to uncertainty in radiometer measurements. This low frequency noise comes from gain drifts and other fundamental processes in electronic circuits. The noise acts within the calibration interval timeframe, cannot be reduced by increasing integration time and bandwidth, and so places fundamental limitations on the radiometer performance.

While 1/f noise is always present in electronic circuits, some materials exhibit high noise levels which require a solution. In systems using indium phosphide (InP) amplifiers in particular, necessary for amplifying frequencies over ~90 GHz, 1/f noise can cause significant performance degradation.

One approach to reducing the impact of 1/f noise is known as Dicke switching. See M. Ogut, et al., "A Novel 1/f Noise Mitigation Technique Applied to a 670 GHz Receiver," Journal of the IEEE on Transactions on Terahertz Science and Technology, vol. 11, no. 1, at 109-112, January 2021. Dicke switching requires making rapid measurements of both the signal and a stable reference. While Dicke switching can reduce or eliminate the 1/f contribution, Dicke switching reduces the measurement time by the time spent measuring the reference and suffers from a factor of 2 degradation in white noise contribution, resulting in an overall delta-T degradation and increased uncertainty and sensitivity in the final measurements of the instrument.

What is needed is a way to reduce or eliminate 1/f noise without incurring a degradation in sensitivity.

SUMMARY

Embodiments of the present disclosure provide methods and systems for reducing or eliminating 1/f noise in radiometers. As disclosed herein, a method of reducing or eliminating 1/f noise in a radiometer may comprise power-cycling elements within the radiometer, such as amplifiers, analog-to-digital ("A/D") converters, a square law detector, etc., between each measurement taken by the radiometer. By turning active components such as A/D converters, amplifiers, a power measurement device, such as a square law detector, etc., off and on for each measurement, the radiometer may effectively start clean with each measurement and long-term effects of 1/f noise, which may degrade the resulting estimate, may be eliminated. By operating a radiometer using a power-cycling method as described herein, an estimate of scene temperature may be obtained with reduced noise as compared to conventional radiometer systems.

Conventional radiometer systems may include power-cycling the input stage amplifier to create a Dicke reference. This has been demonstrated where it is impractical to insert a microwave switch due to high insertion loss. In such a system, during the measurement time, on the order of, for example, ten milliseconds, a number of measurements of a signal and a reference may be made. While creating a Dicke reference can help reduce 1/f noise, the Dicke reference process causes a degradation of the precision of the system by a factor of two because half of the measurement time is used to measure a reference instead of the actual signal, i.e., the unknown quantity.

As described herein, a process of rapidly turning off and on power to components within a radiometer system between each measurement, and without making a measurement of the off-state, using power-cycling to reset the system for every measurement reduces or eliminates 1/f noise without suffering from a loss in precision as compared to a Dicke reference system. When components within a radiometer system are turned off and on, the system should be in a similar initial state for every measurement. In this way, any long-term memory effects that cause issues in conventional systems can be avoided. Since the time required to power cycle the components is much less than the measurement time and can be accomplished during reset and data read intervals between measurements, there is no reduction in integration time and associated increase in measurement uncertainty.

Silicon chips and other substrates for semiconductors, such as gallium arsenide, gallium nitride, and indium phosphide (InP), exhibit 1/f noise where the gain will vary randomly over time. Use of these technologies is necessary at high frequencies, because the 1/f noise contributed by these technologies becomes an issue which needs to be corrected. By removing power to active electronics, which use a 1/f noise-prone technology such as InP, and then re-applying the power a period of time later, e.g., ten to one hundred microseconds, 1/f noise can be reduced or eliminated. By consistently re-applying the power to active electronics (for example in the electronic gain stage) only for the remainder of the time interval (e.g., ten milliseconds), 1/f noise may thereby be reduced during the calibration interval, and the measurement may be taken as normal with reduced or eliminated 1/f noise.

Systems and methods as described herein may be used in at least one embodiment in relation to a radiometer with a scanning antenna on a satellite used to scan over the earth. A reflector may rotate over a period of time, e.g., once every two seconds, and a reflector beam may sweep out a path on the ground over each rotation. Measurements of scene temperatures may be made on intervals, such as ten milliseconds. In this way, scene temperature contours may be created, in the form of a raster scan that gets calibrated at the end of each sweep. Each measurement represents a beam traveling across an area for around ten milliseconds, which would allow for about 200 measurements in a 2-second calibration interval. This time includes measurements of the scene, measurements of the hot and cold references, and unused time to transition between the calibration and scene measurements.

Without the systems and methods described herein, gain variations caused by 1/f noise may cause errors or inaccuracies in the measurements. For example, using the systems and methods described herein, following every measurement interval, e.g., every 10 milliseconds, the power electronics within the radiometer system may be shut off for a period of time, e.g., for 10 microseconds, and restart before the next measurement is made. By power cycling components within the radiometer system in this way, 1/f noise can be mitigated.

During the off-state between measurements, in which power to electrical components is switched off, no off-state reference is measured. Because the off-state is very brief, e.g., 10 microseconds, relative to the measurement interval, e.g., 10 milliseconds, and no measurements take place during the off-state, the vast majority of the available duty cycle time (e.g., 10 milliseconds of each 10.01 millisecond period) can be spent measuring the actual scene or performing hot or cold calibration. In this way, a more precise measurement may be made while avoiding any unwanted electronic component memory issues which cause 1/f noise.

As disclosed herein, power cycling may be used to mitigate, reduce, or eliminate 1/f noise contribution from the first stage or stages of the radiometer system. Power-cycling a receiver during the first stages reduces 1/f contribution independent of Dicke switching architectures. By power-cycling briefly between measurements with a total power radiometer, 1/f noise may be reduced without suffering the factor of 2 degradation in sensitivity which occurs with conventional Dicke radiometer systems.

Additional features and advantages of embodiments of the present disclosure will become more readily apparent from the following description, particularly when considered together with the accompanying drawings.

DETAILED DESCRIPTION

Figure 1:
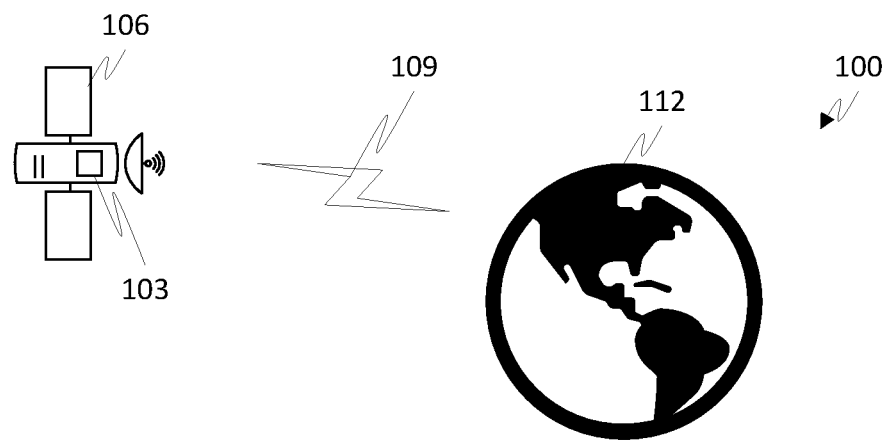
FIG. 1 depicts an example scenario in which a radiometer implementing a process in accordance with embodiments of the present disclosure is used to obtain data.

As shown in FIG. 1, a radiometer system 103 may be implemented in an environment 100 by mounting the radiometer system 103 on a device such as a satellite 106 in orbit around a planet 112. It should be appreciated the environment 100 is shown for illustration purposes only and a radiometer system 103 as described herein may be used in a wide variety of applications and need not be mounted on any moving device. The radiometer system 103 may be configured to receive and measure signals 109 such as low-level thermal emission signals.

Figure 2:
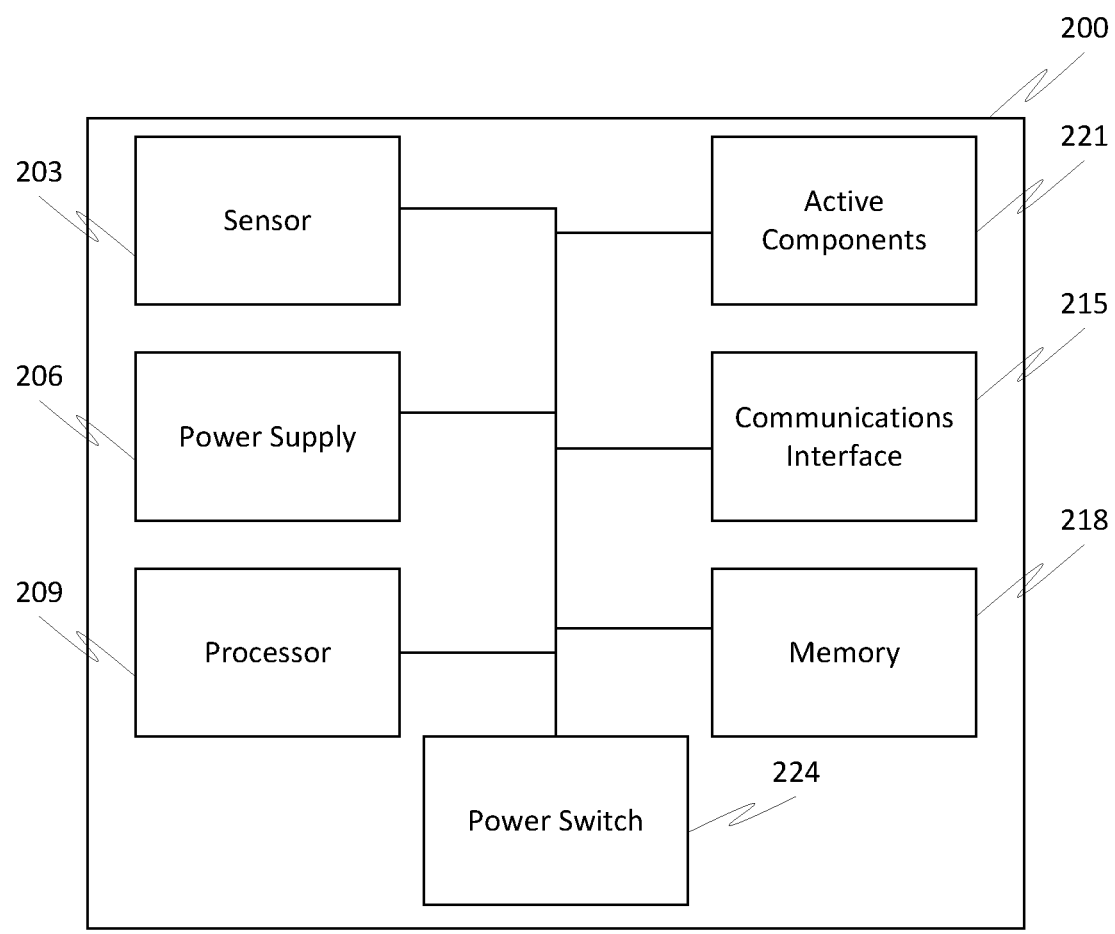
FIG. 2 depicts components of an example radiometer system in accordance with embodiments of the present disclosure.

FIG. 2 depicts components of an example radiometer system 200 in accordance with embodiments of the present disclosure. In general, the system 200 depicted in FIG. 2 is in the form of a radiometer, for example such as may be carried by a satellite, space vehicle, or other mobile or stationary platform.

In some embodiments, a radiometer system 200 may comprise a number of elements as illustrated in FIG. 2. The radiometer system 200 may comprise a sensor 203 such as an infrared radiometer, microwave radiometer, or any type of sensor. The sensor 203 may be configured to estimate a power of any signal at the input of the sensor, such as power emitted by the atmosphere, power emitted from the ground, solar radiation, any man-made interference from transmitters, etc.

The sensor may be operated through the control of a processor 209 executing software or instructions stored in memory 218. The system 200 can additionally include a communications interface 215 and a power supply 206. The processor 209 can include a general purpose programmable processor, graphics processing unit (GPU), a field programmable gate array (FPGA), controller, or other processing device or set of devices capable of executing instructions for operation of the system 200. Instructions executed by the processor 209 can be stored as application programming in the memory 218. The memory 218 can include one or more volatile or nonvolatile solid-state memory devices such as but not limited to RAM, SDRAM, or the like. Alternatively, or additionally, the memory 218 can include one or more mass storage devices, such as, but not limited to, hard disk drives, optical storage devices, solid-state drives, or the like. In addition to providing storage for application programming, the memory 218 can store sensor data, intermediate or final data products, or other data or reference information, such as but not limited to collected sensor data.

The radiometer system 200 may also comprise a power supply 206. The power supply 206 may be configured to output power needed for active components 221 such as amplifiers, A/D converters, a power measurement device, such as a square law detector, etc., as well as other electric components such as the processor 209, etc. Power from the power supply 206 may be controlled by the processor 209 for example by turning on and off one or more power switches 224. The power supply 206 may be used to power-cycle one or more components 221 within the system 200 such as one or more of amplifiers and A/D converters. Power to components 221 may individually be controlled, such as through the use of switches enabling or disabling power supplied to each particular component 221. In some embodiments, a single switch may be used to control the power applied to one or more components 221, while in some embodiments, power may be turned off and on for all components 221 simultaneously.

The radiometer system 200 may comprise one or more processors 209 which may be configured to execute applications such as applications configured to measure power, calibrate the sensor 203, measure readings from the sensor 203, provide a clock signal for timing measurements and other intervals, etc.

The radiometer system 200 may also comprise one or more communications interfaces 215 configured to transmit data to and from the radiometer system 200. For example, the communications interface 215 may be used to read radiometer measurements from the system 200. In some embodiments, the radiometer system 200 may comprise a display configured to display a graphical user interface for displaying sensor measurements and other data.

The radiometer system 200 may further comprise one or more memory devices 218 configured to, for example, store sensor readings, application data, and other information. The memory devices 218 may be configured to be read and written by the processor 209.

Figure 3A:
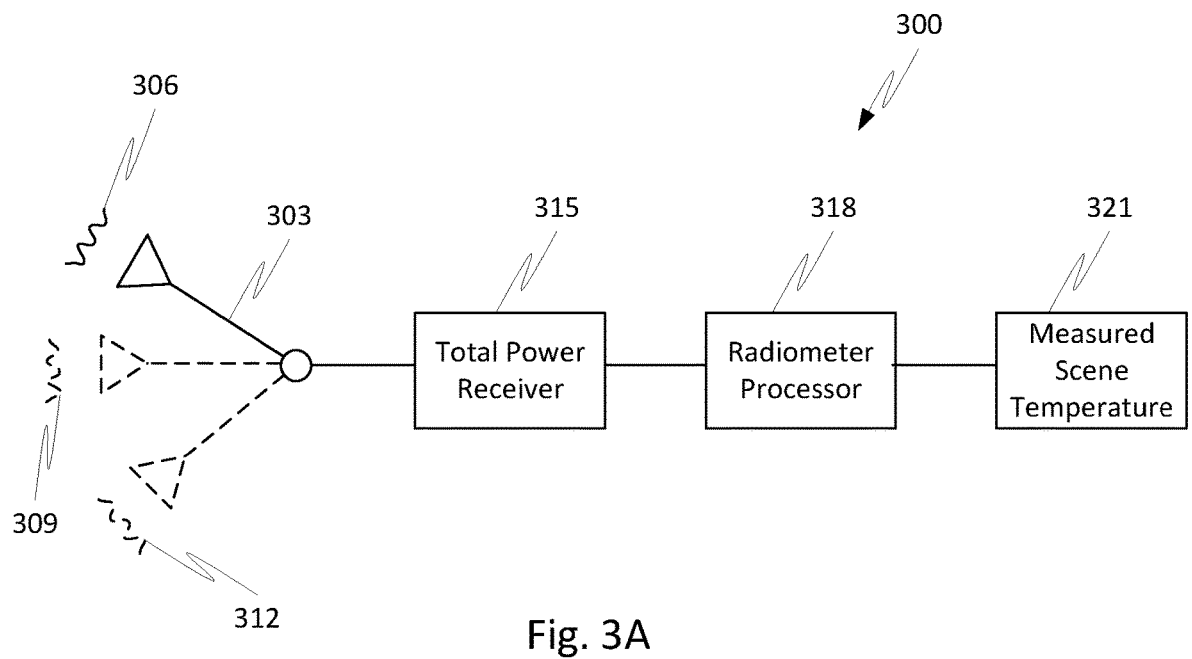
FIG. 3A depicts components of a conventional radiometer system.

A conventional total power radiometer 300 is illustrated in FIG. 3A. A conventional total power radiometer 300 comprises a receiver arm 303 configured to selectively receive data from a scene 306, one or more cold calibration targets 309, and one or more hot calibration targets 312. Data as received by the receiver arm 306 may be received by a total power receiver 315 which may be processed and analyzed using a radiometer processor 318 to generate a measured scene temperature 321. A conventional total power radiometer 300 may be configured to measure a plurality of scene temperatures during a first period of time, e.g., one second, before and/or after measuring a hot calibration 312 and a cold calibration 309 for a second period of time, e.g., a quarter-second. The conventional total power radiometer 300 may then use the hot calibration as a first endpoint on a linear scale and the cold calibration 309 as a second endpoint on the linear scale to estimate a measurement of the scene temperature 306 by assigning a temperature to an average of the scene measurements by using a known approximately-linear relationship of the receiver 300. It should be appreciated that radiometer designs may incorporate small corrections to this linear relationship to provide better accuracy in measurements.

Figure 3B:
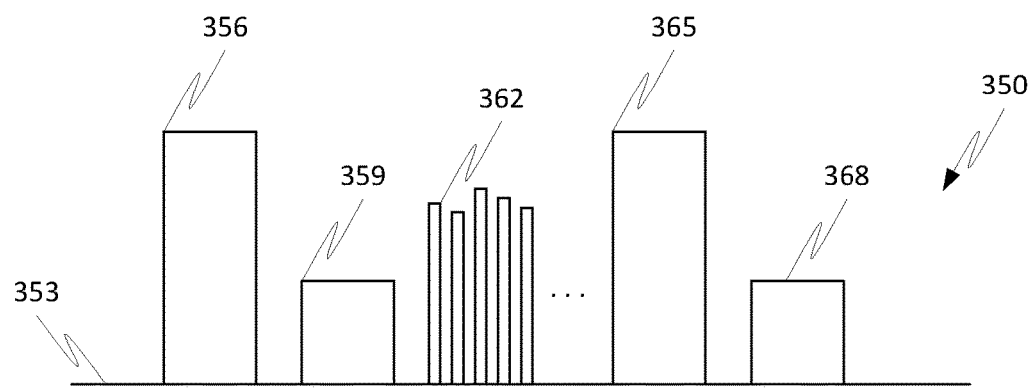
FIG. 3B depicts an output of a conventional radiometer system.

As illustrated in FIG. 3B, measurements 350 may be taken along a time scale 353. A hot calibration measurement 356 may be made for a first period of time, a cold calibration measurement 359 may be made for a second period of time, a plurality of scene measurements 362 may be made, each for a third period of time, a second hot calibration 365 may be made for a fourth period of time, and a second cold calibration 368 may be made for a fifth period of time. Each of the first through fifth periods of times may be the same or different depending on applications. Scene measurements 362 may be taken repeatedly on an interval until a particular desired or sufficient number of measurements have been made.

Figure 4A:
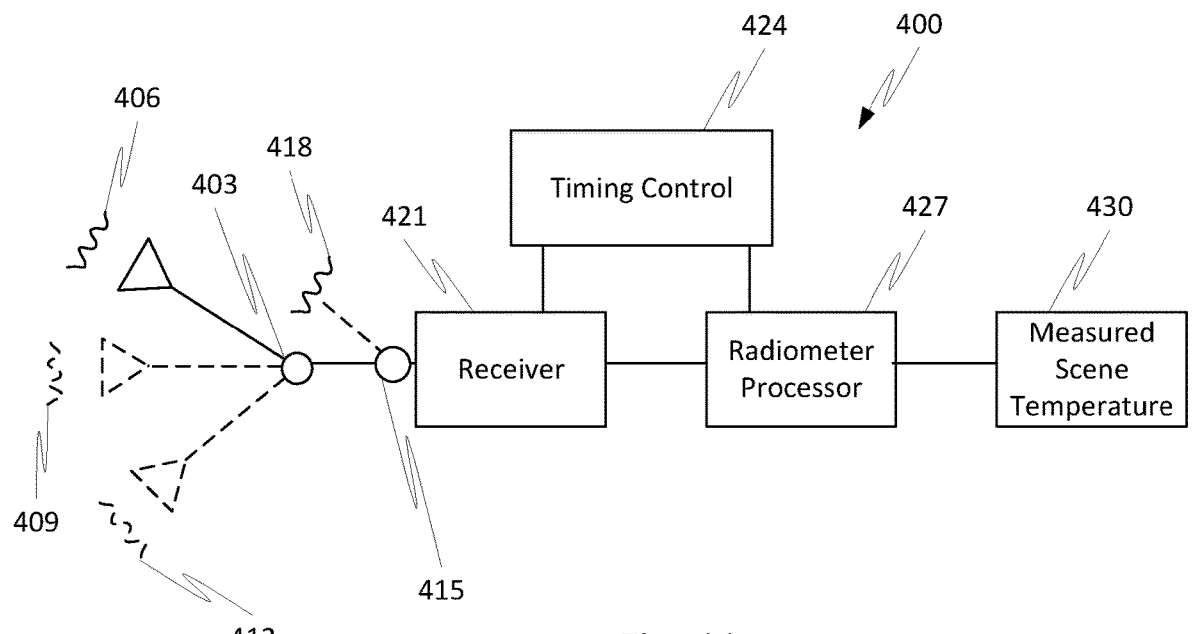
FIG. 4A depicts components of a conventional Dicke reference radiometer system.

As illustrated in FIG. 4A, a conventional Dicke radiometer 400 may, similar to the conventional total power radiometer 300, comprise a signal arm 403 configured to selectively receive data from a scene 406, cold calibration 409, and hot calibration 412. Similar to the conventional total power radiometer 300, the Dicke radiometer 400 may take a plurality of scene measurements (e.g., 100 measurements) along with a cold calibration and a hot calibration, but during that time, the Dicke radiometer 400 may continuously switch between reading, with a total power receiver 421, the signal arm 403 (with the scene temperature, cold calibration, and hot calibration) and a Dicke reference arm 415 which may be configured to read a reference signal 418. During every measurement, (of a scene 406, cold calibration 409, and hot calibration 412) the radiometer 400 switches between the signal arm 403 and the Dicke reference arm 415 and takes a difference between the two measurements. One issue with a Dicke radiometer is that the amount of time in which the scene 406 is measured is reduced by half due to the Dicke reference. Reducing the amount of time the scene is measured reduces the quality of the measurements and the performance of the radiometer.

Figure 4B:
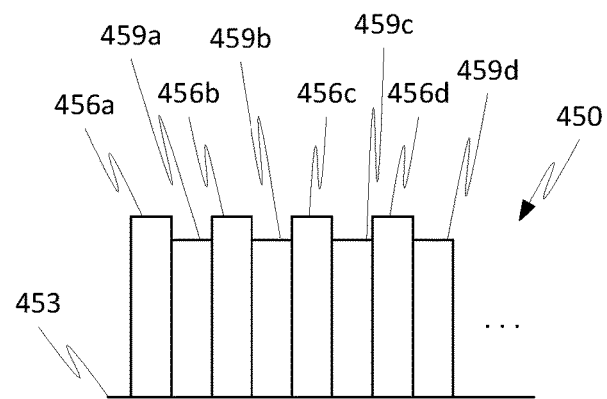
FIG. 4B depicts an output of a conventional Dicke reference radiometer system.

As illustrated in FIG. 4B, scene measurements 456*a-d* and Dicke reference measurements 459*a-d* of a Dicke radiometer may be taken along a time scale 453. A hot calibration measurement and a cold calibration measurement (not illustrated) may be taken before and/or after the scene measurements 456*a-d* and Dicke reference measurements 459*a-d*. Each scene measurement 456*a-d* may be captured using the signal arm 403 while each Dicke reference measurement 459*a-d* may be captured using the Dicke reference arm 415. As illustrated in FIG. 4B, the measurements of the scene 456*a-d* and the Dicke reference 459*a-d* may be switched repeatedly until a necessary number of measurements 456*a-d*, 459*a-d* have been captured depending on the application or desired accuracy. While a Dicke radiometer may reduce 1/f noise, a factor of two degradation in precision is incurred due to the switching between the Dicke reference signal and the scene signal and taking the difference between the two measurements.

Figure 5A:
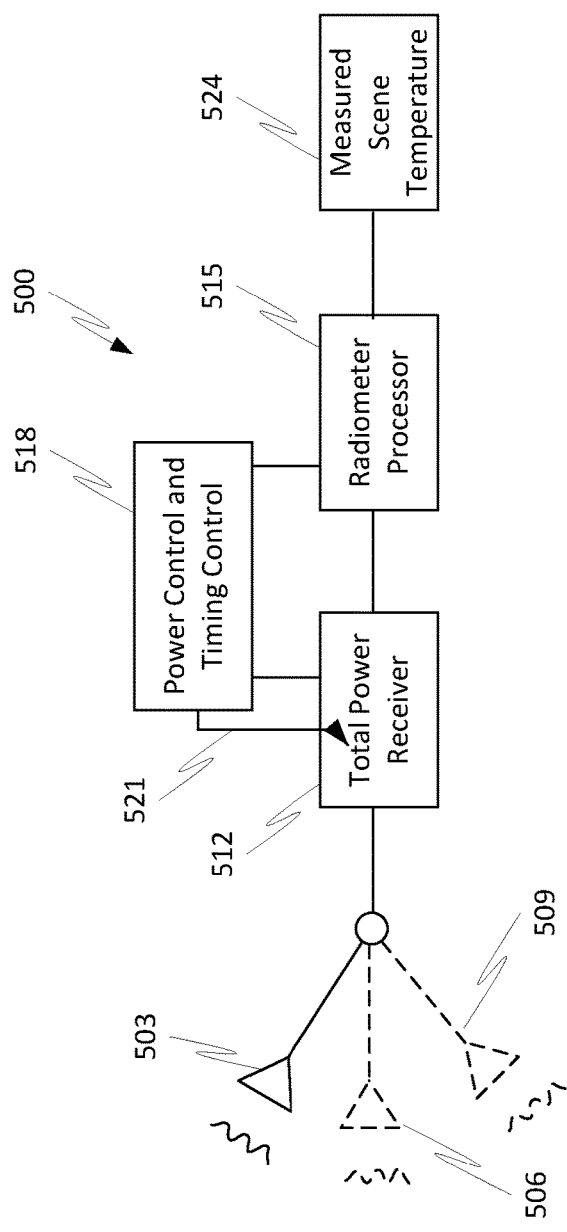
FIG. 5A depicts components of a radiometer system in accordance with embodiments of the present disclosure.

As illustrated in FIG. 5A, an exemplary radiometer system 500 may be operated in accordance with one or more of the embodiments described herein in such a way as to reduce or eliminate 1/f noise without incurring the same factor of two degradation in precision. The radiometer system 500 may be as illustrated in FIG. 2 and may comprise one or more power amplifiers, A/D converters, and other active components 221 within the radiometer. Depending on the application, certain active components may be powered off and on as part of the method 600. In the radiometer system 500, a power control and timing control system 518 may be used to power switch active components, such as amplifiers, A/D converters, a power measurement device, such as a square law detector, etc., of a total power receiver 512 to reset the active components 221 between each measurement. Because some delay of time is required between measurements for resetting the integrator and reading data, no time is sacrificed due to the resetting of the active components as described herein. As should be appreciated, using a radiometer as described herein, all of the available time is used in measuring the scene and no time is allocated to measuring a Dicke reference. The radiometer system 500 is further distinct from a Dicke radiometer 400 in that a second arm, i.e., the Dicke reference arm 415, is not required.

In accordance with one or more of the embodiments described herein, one or more active components, such as amplifiers (e.g., a 90-GHz amplifier, an input amplifier, or other type of amplifier), a power measurement device, such as a square law detector (e.g., a detection diode), A/D converters, etc., of a radiometer 500 may be switched off and on before each measurement taken by the radiometer. In contrast to conventional radiometers, in which time is spent creating a Dicke reference or an estimate of the reference state or the power off state, using a radiometer as described herein virtually no time is wasted between measurements. Instead, time between measurements is leveraged to reset active components, eliminating or mitigating 1/f noise. Each time an active component is turned on, the active component will be in a new or fresh state. This new state can be expected to be the same for each measurement, thus removing or reducing any memory in the active component which causes 1/f noise.

Figure 5B:
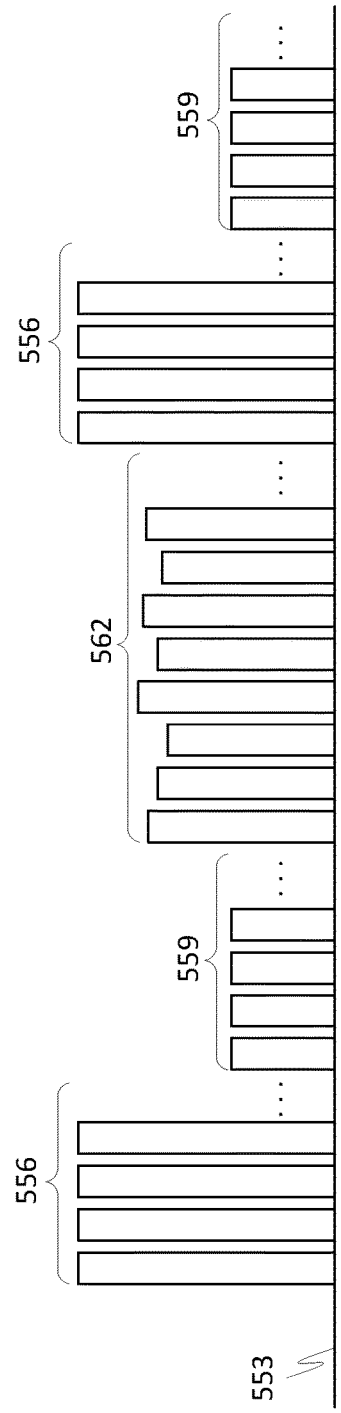
FIG. 5B depicts a timeline of radiometer measurements in accordance with embodiments of the present disclosure.

As illustrated in FIG. 5B, measurements including hot calibration 556, cold calibration 559, and scene measurements 562 may be taken along a timeline 553. Between each measurement 562, an amount of time, represented by the gaps between measurements 556, 559, 562, may be used to power off and on active components such as power amplifiers, A/D converters, a square law detector, etc. In some embodiments, each scene measurement 562 may last around 10 milliseconds and be separated by a gap of around ten microseconds in which the power switching may be performed. This gap may be similar to or the same as the wait time integral described below and illustrated in FIG. 6.

For illustration purposes, the timeline 553 of FIG. 5B shows an initial set of hot and cold calibration measurements 556, 559, followed by a set of scene measurements 562, and ending with a second set of hot and cold calibration measurements 556, 559. However, it should be appreciated that radiometers typically operate in a continually repeated measurement process. The second set of hot and cold calibration measurements 556, 559 may be followed by another set of scene measurements 562, another set of hot and cold calibration measurements 556, 559, or other measurements. In this way, a series of sets of scene measurements separated by calibration measurements may be captured.

Furthermore, while only four of each of the calibration measurements 556, 559, and eight scene measurements 562 are illustrated, it should be appreciated any number of measurements may be made in each set of hot and cold calibration measurements 556, 559, and scene measurements 562. Also, it should be appreciated that the widths, i.e., the time durations, of each of the measurements and the gaps between are not necessarily to scale. In some embodiments, each measurement may be around ten milliseconds separated by a time gap of around ten microseconds. In other embodiments, the measurements and/or time gaps may be other durations.

Using a system as described herein, measurements may be made for a high proportion of the time the radiometer 500 is operating. For example, in some embodiments, measurements may be made for 99% of the time and during only one percent of the time no measurement may be made while power to active components is switched off and on. It should be appreciated the percentage of time the power is turned off and on may be adjusted as needed. In at least one embodiment, active component power is turned off for one microsecond between measurements. The amount of time the power is switched off may be a function of how quickly the power supply, or the power held within certain active components such as amplifiers and A/D converters, can be dropped to zero volts and brought back to a proper power level.

Each measurement of the radiometer may be taken on an interval of, for example, ten milliseconds. In some embodiments, each calibration (hot and cold) may be a number of measurements, for example ten measurements each, and the scene itself may be measured, for example, one hundred times across a single scan. As successive measurements are made, one or more of the active components within the radiometer may be powered off and on. For example, the active components may be power-cycled every ten milliseconds—once for every measurement. Power may be switched off for a first period of time, e.g., ten microseconds, before the power is switched back on. Once the power is switched back on, a measurement may be taken, read, processed, etc., and the process may repeat. In some embodiments, during the time the power is switched off and back on, steps such as reading, processing, storing, or otherwise handling measurements may be performed in parallel.

Figure 6:
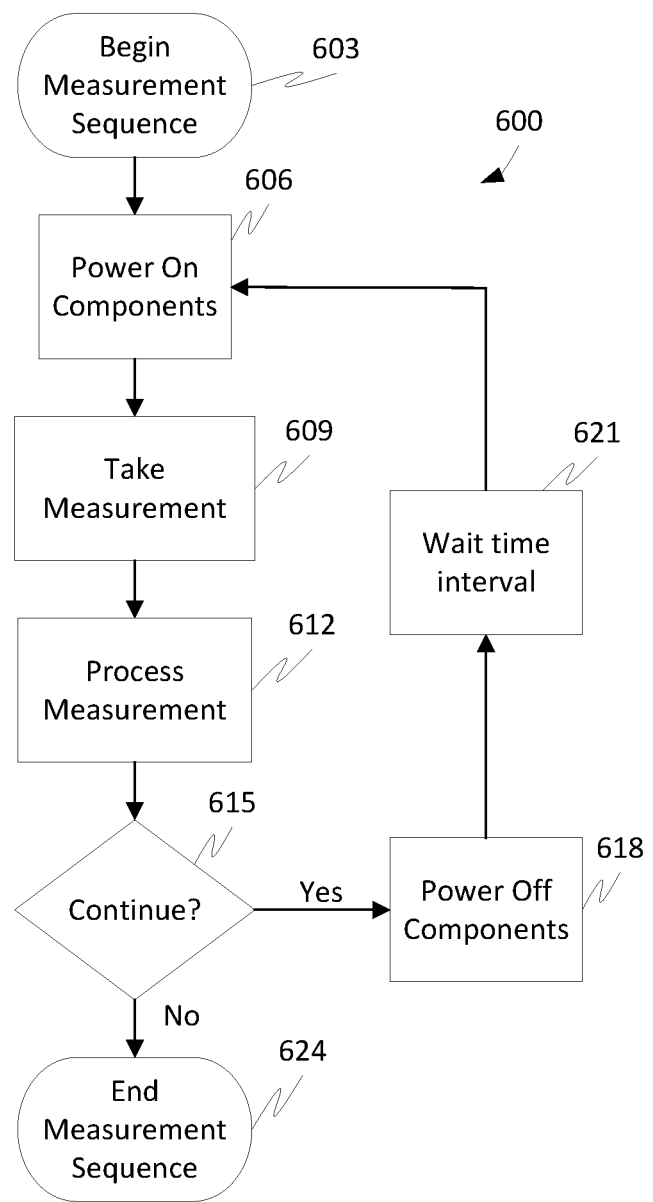
FIG. 6 is a flowchart depicting aspects of a process for mitigating the effect of 1/f noise on data obtained using a radiometer in accordance with embodiments of the present disclosure.

As illustrated in FIG. 6, a method 600 of operating a radiometer in such a way as to reduce or eliminate 1/f noise, without incurring the factor of two degradation incurred by Dicke radiometer systems, may be performed using a radiometer system 500 as illustrated in FIG. 5A. The method 600 may begin with the radiometer system 500 being activated by a user, automatically being activated upon deployment, or otherwise activated. The radiometer system 500 may be onboard a satellite as illustrated in FIG. 1 or another device or may be stationary.

At 603, a measurement sequence may begin. In some embodiments, the measurement sequence may include hot and/or cold calibration and scene measurements. The measurement sequence may begin upon user command or may be automatically triggered in response to one or more events. In some embodiments, the measurement sequence may repeat on intervals. For example, a measurement sequence as described herein may comprise powering on active components, taking a measurement, and powering off the active components. A measurement sequence may include a measurement taken either for hot calibration, cold calibration, scene measurement, or other purpose. Between each of the measurements, active components may be reset. After a first measurement sequence is performed, a second measurement sequence may automatically begin, and in this way a series of measurements may be captured on intervals. A measurement sequence as described herein may be part of a series of measurements including sets of hot and/or cold calibration measurements followed by a series of one hundred, or another number, of scene measurements.

At 606, prior to taking a measurement, power may be applied to one or more active components of the radiometer system 500. The radiometer system 500 may be as illustrated in FIG. 2 and may comprise one or more power amplifiers, A/D converters, and other active components 221 within the radiometer. Depending on the application, certain active components may be powered off and on as part of the method 600. In some embodiments, applying power to a component may comprise turning on a power supply. In some embodiments, applying power may comprise switching a switch connecting a power supply to a component. It should be appreciated that in some embodiments, active components 221 may, upon initiating the measurement sequence, already be powered on. Powering on elements may only be required after the active components are actively powered off.

At 609, once the components to which the power is applied at 606 are powered-on to an adequate level, a measurement may be taken. The adequate level may be a particular voltage at which each element is rated to operate. In some embodiments, taking a measurement may comprise using a processor to receive data from a sensor. Depending on the application, each measurement may take a particular amount of time, such as ten milliseconds. In some embodiments, taking a measurement may comprise taking a measurement of a cold or hot calibration or of a scene. Measurements may be taken in sets. For example, hot calibration measurements may be taken in a set of ten, followed by a set of ten cold calibration measurements, followed by a set of one hundred scene measurements. Whether the measurement being taken is for calibration or for scene measurement purposes may affect the number of measurements taken. The numbers provided herein are for illustration purposes only and should not be considered as limiting in any way. Furthermore, the order of measurements, e.g., hot calibration before cold calibration before scene measurements, is provided as an example only and in practice the order could be altered in any way.

At 612, measurement data from the measurement taken at 609 may be processed and/or stored in memory. Processing a measurement from a sensor may comprise receiving measurement data from the sensor and storing the sensor data in memory. It should be appreciated that in some embodiments, the step 612 of processing the measurement may be optional and data may be processed at a later time.

At 615, the method 600 may comprise determining whether the measurements should continue. In some embodiments, the method 600 may continue until a particular number of measurements, such as one hundred measurements, have been made. If the method 600 is to continue with additional measurements, at 618 one or more active components 221 of the radiometer system 500, such as amplifiers, A/D converters, a square law detector, etc., may be powered off for a period of time. In some embodiments, powering off components may comprise turning off a power supply connected to each component. In some embodiments, powering off components may comprise switching off one or more switches. For example, each component to be powered off may be connected to a power supply via a switch. Each switch may be switched to turn power off to each component as necessary.

After powering off the active components 221 at 618, the method 600 may comprise waiting a particular amount of time at 621. This amount of time may be selected based on an amount of time required for active components being switched off to reach an internal voltage of or near zero. The interval may be selected based on characterized/best time durations. An amount of time may be selected such that the duration is sufficient to resolve 1/f noise and to generate the resetting feature w/o adversely affecting scene measurement time.

After waiting the amount of time at 621, the method 600 comprises powering on the active components 221 at 606. After the active components are powered, another measurement may be taken at 609. Each measurement as described herein may be a scene measurement, a hot calibration measurement, a cold calibration measurement, or another type of measurement.

In some embodiments, powering on the active components at 606 may comprise waiting an amount of time for the active components to be fully or sufficiently powered. Such an amount of time may be dependent on the active components being power cycled and the amount of time necessary for the active components to be sufficiently powered in order for a next measurement to be taken. In some embodiments, power may be switched off for around ten microseconds before the power is reapplied to the active components.

In some embodiments, the step of processing the measurement data at 612 may be performed in parallel with powering off the active components at 618 until the components are powered on at 606. By performing the processing and the power cycling in parallel, series of measurements can be taken with little to no unnecessary downtime. For example, if the active components are powered off for less than ten microseconds, each measurement may be captured about ten microseconds after the completion of a previous measurement. Using such a system, 1/f noise is reduced or eliminated without causing delay while avoiding any unnecessary delays.

While in conventional systems, successive measurements result in the buildup of 1/f noise, using a method 600 as described herein, each measurement will have little to no 1/f noise as compared to previous measurements.

If, at 615, the method 600 is to end, the method 600 may end at 624. At the end of the method 600, memory of the radiometer system may contain processed and/or raw sensor data as captured during the method 600 by the sensor of the radiometer system.

The foregoing discussion of the disclosed systems and methods has been presented for purposes of illustration and description. Further, the description is not intended to limit the disclosed systems and methods to the forms disclosed herein. Consequently, variations and modifications commensurate with the above teachings, within the skill or knowledge of the relevant art, are within the scope of the present disclosure. The embodiments described herein are further intended to explain the best mode presently known of practicing the disclosed systems and methods, and to enable others skilled in the art to utilize the disclosed systems and methods in such or in other embodiments and with various modifications required by the particular application or use. It is intended that the appended claims be construed to include alternative embodiments to the extent permitted by the prior art.

What is claimed is:

1. A radiometer, comprising:
   a sensor;
   one or more active components, the active components comprising one or more of an amplifier, a power measurement device, and an A/D converter;
   a processor; and
   computer-readable storage medium storing computer-readable instructions that, when executed by the processor, cause the processor to:
      perform a first measurement with the sensor;
      after performing the first measurement, switch power to the one or more active components off;
      after switching the power to the one or more active components off, switch the power to the one or more active components on;
      in parallel with switching the power to the one or more active components off, process the first measurement; and
      after switching the power to the one or more active components on, perform a second measurement with the sensor.

2. The radiometer of claim 1, wherein the one or more active components comprise one or more input amplifiers.

3. The radiometer of claim 1, wherein the one or more active components comprise one or more A/D converters.

4. The radiometer of claim 1, wherein the power measurement device is a square law detector.

5. The radiometer of claim 1, wherein the second measurement comprises no additional 1/f noise as compared to the first measurement.

6. The radiometer of claim 1, wherein the first and second measurements comprise one or more of a hot calibration measurement and a cold calibration measurement.

7. The radiometer of claim 1, wherein switching the power to the one or more active components off comprises switching the power off for a time period greater than zero seconds before switching the power to the one or more active components on.

8. The radiometer of claim 7, wherein the second measurement is performed a time period of more than zero seconds after the first measurement is completed.

9. The radiometer of claim 1, wherein the first and second measurements are measurements of a scene temperature.

10. The radiometer of claim 1, wherein the first and second measurements are a series of measurements, wherein between each measurement of the series of measurements the power to the one or more active components is switched off and on.

11. The radiometer of claim 10, wherein the instructions further cause the processor to use the series of measurements to build a raster scan of a scene.

12. The radiometer of claim 1, wherein the instructions further cause the processor to, after switching the power to the one or more active components off and prior to switching the power to the one or more active components on, wait a period of time sufficient for a voltage within each of the one or more active components to reach zero.

13. The radiometer of claim 1, wherein each of the first and second measurements are associated with one or more of atmospheric noise power, radiant energy emitted from a ground, solar radiation, and sensor calibration.

14. A method of using a radiometer, the method comprising:
performing a first measurement with a sensor of the radiometer;
after performing the first measurement, switching power to one or more active components of the radiometer off, the active components comprising one or more of an amplifier, a power measurement device, and an A/D converter;
after switching the power to the one or more active components off and prior to switching the power to the one or more active components on, wait a period of time sufficient for a voltage within each of the one or more active components to reach zero;
after switching the power to the one or more active components off, switching the power to the one or more active components on; and
after switching the power to the one or more active components on, performing a second measurement with the sensor.

15. The method of claim 14, wherein the one or more active components comprise one or more input amplifiers.

16. The method of claim 14, wherein the one or more active components comprise one or more A/D converters.

17. The method of claim 14, wherein the second measurement comprises no additional 1/f noise as compared to the first measurement.

18. A computer program product comprising:
a non-transitory computer-readable storage medium having computer-readable program code embodied therewith, the computer-readable program code configured, when executed by a processor, to execute a method, the method comprising:
performing a first measurement with a sensor of a radiometer;
after performing the first measurement, switching power to one or more active components of the radiometer off, the active components comprising one or more of an amplifier, a power measurement device, and an A/D converter;
after switching the power to the one or more active components off, switching the power to the one or more active components on;
in parallel with switching the power to the one or more active components off, processing the first measurement; and
after switching the power to the one or more active components on, performing a second measurement with the sensor.

19. The computer program product of claim 18, wherein the one or more active components comprise one or more A/D converters.

20. The computer program product of claim 18, wherein the one or more active components comprise one or more input amplifiers.

* * * * *